United States Patent [19]

Phillips

[11] Patent Number: 5,059,900
[45] Date of Patent: Oct. 22, 1991

[54] METHOD AND APPARATUS FOR DETERMINING THE ANGULAR VELOCITY OF A SHAFT

[75] Inventor: Edward H. Phillips, Rochester Hills, Mich.

[73] Assignee: Techco Corporation, New York, N.Y.

[21] Appl. No.: 558,603

[22] Filed: Jul. 26, 1990

Related U.S. Application Data

[63] Continuation-in-part of Ser. No. 534,437, Jun. 6, 1990.

[51] Int. Cl.[5] .......................... G01P 3/42; G01P 3/48; G01P 3/54; G01B 7/14
[52] U.S. Cl. ................................... 324/160; 324/173; 324/207.11; 324/207.16; 324/207.25
[58] Field of Search ...................... 324/207.11, 207.13, 324/207.14, 207.15, 207.16, 207.17, 207.22, 207.23, 207.24, 207.25, 207.26, 160, 173, 174; 340/870.31

[56] References Cited

U.S. PATENT DOCUMENTS

3,079,548 2/1963 Robinson ..................... 340/870.31

Primary Examiner—Walter E. Snow
Attorney, Agent, or Firm—Harness, Dickey & Pierce

[57] ABSTRACT

A tachometer particularly adapted for operation as a rotational velocity feedback transducer is provided. First and second proximity detectors are used to monitor orthogonal positions of an irregular surface portion of a rotating shaft and provide x and y signals that are substantially in quadrature. The x and y signals are differentiated with respect to time to provide differential signals that are representative of dx/dt and dy/dt, respectively. Signals representative of products x dy/dt and y dx/dt are generated from the x signal and the differential signal dy/dt, and the y signal and the differential signal dx/dt, respectively. A signal representative of algebraic sum x dy/dt−y dx/dt is generated from the signals representative of products x dy/dt and y dx/dt. A signal representative of quotient of (x dy/dt−y dx/dt) divided by the square of the displacement $r^2$ of the irregular surface portion is generated from the signal representative of algebraic sum (x dy/dt−y dx/dt) which signal is representative of the rotational velocity of the rotating shaft.

20 Claims, 6 Drawing Sheets

DERIVE A SIGNAL REPRESENTATIVE OF THE ROTATIONAL VELOCITY OF AN INPUT SHAFT OF A TACHOMETER

MEASURE x AND y
GENERATE DERIVATIVES dx/dt AND dy/dt
GENERATE PRODUCTS x dy/dt AND y dx/dt
GENERATE ALGEBRAIC SUM (x dy/dt - y dx/dt)
GENERATE QUOTIENT ( xdy/dt - y dx/dt)/$r^2$

DERIVE A SIGNAL REPRESENTATIVE OF THE ROTATIONAL VELOCITY OF AN INPUT SHAFT OF A TACHOMETER

MEASURE x', x", y' AND y"
↓
GENERATE SUMS x = x' + x" AND y = y' + y"
↓
GENERATE DERIVATIVES dx/dt AND dy/dt
↓
GENERATE PRODUCTS x dy/dt AND y dx/dt
↓
GENERATE ALGEBRAIC SUM (x dydt - y dx/dt)
↓
GENERATE QUOTIENT (x dydt - y dx/dt)r

METHOD AND APPARATUS FOR DETERMINING THE ANGULAR VELOCITY OF A SHAFT

CROSS-REFERENCE TO RELATED APPLICATION

This is a continuation-in-part application of U.S. Pat. application Ser. No. 534,437, filed June 6, 1990.

BACKGROUND AND SUMMARY OF THE INVENTION

The present invention relates generally to tachometers commonly utilized in electronically controlled servo systems.

Tachometers typically generate a signal (i.e. voltage or frequency) which is substantially proportional to its input shaft rotational velocity. Tachometers are often utilized in electronically controlled servo systems, either as feedback transducers for velocity servomechanisms or as feedback transducers in derivative feedback compensators for position servomechanisms. Such servomechanisms, and their system applications are explained in considerable detail in a book entitled FEEDBACK AND CONTROL SYSTEMS by Di Stefano III, Stubberud and Williams, and published as one of Schaum's Outline Series in Engineering by the McGraw-Hill Book Company of New York.

Conventionally, tachometers include an armature rotating within a fixed permanent magnet field such that voltage generated as a back emf is extracted (i.e., sensed) via a commutator-brush assembly. Unfortunately, the commutator-brush assembly detracts from the performance of such a tachometer because of brush drag and electronic noise as well as other related hysteresis effects. Thus, brushless tachometers utilizing a rotating permanent magnet field and a fixed armature are often used in applications which mandate superior performance. Generally, brushless tachometers are considered superior to brush-type tachometers. However, because brushless tachometers typically have fewer armature windings, they often have greater output voltage ripple.

Accordingly, the present invention is a greatly simplified tachometer which has no armature and therefore no commutator-brush assembly nor solid state switching arrangement. The simplified tachometer is environmentally stable, has a substantially reduced output voltage ripple and can be constructed with extremely low values of rotational inertia if desired.

In general, the simplified tachometer of the present invention includes an eccentric or other sinusoidally undulating surface formed upon an input shaft whose rotational velocity is to be monitored. Proximity transducers are located within a housing in a quadrature arrangement. The proximity transducers are used to measure co-ordinate displacements x and y of the center of the eccentric with respect to the axis of rotation of the input shaft. The center of the eccentric is offset with respect to the axis of rotation of the input shaft by r, where r is equal to $(y^2+x^2)^{0.5}$. Since rotational position $\Theta$ is equal to $\tan^{-1}(y/x)$, rotational velocity $d\Theta/dt$ is equal to $[1/(1+(y/x)^2)]d(y/x)/dt$. This expression can be arithmetically simplified to $d\Theta/dt=[x\,dy/dt-y\,dx/dt]/(Y^2+x^2)$. Since $r^2=(y^2+x^2)$, this can be further simplified to $d\Theta/dt=[x\,dy/dt-y\,dx/dt]/r^2$.

No further mathematical manipulation is required because both of the terms $x\,dy/dt$ and $y\,dx/dt$ are the product of two terms which preserve their algebraic signs. Thus, the entire expression is a "sign" and "magnitude" correct representation of the rotational speed of the input shaft.

In accordance with a second embodiment of the present invention, the improved tachometer employs a set of axially extending proximity transducers to measure similar coordinate displacements of a sinusoidally undulating surface. The sinusoidally undulating surface undulates with respect to a plane that is substantially orthogonal to the axial direction. In operation, the tachometer of the second preferred embodiment functions in substantially the same manner as the tachometer of the first embodiment described above.

In accordance with another principle feature of the present invention, "common mode" errors caused by transverse and/or axial movement of the input shaft are substantially eliminated by utilizing proximity transducers in arrangements which negate such common mode displacements. As described in a third structural embodiment, two sets of proximity transducers are disposed in an axial direction for measuring coordinate displacements of the sinusoidally undulating surface with respect to a plane that is substantially orthogonal to the axial direction. The two sets of transducers are positioned such that they are in an electronically opposed orientation (i.e., their output signals are 180 electrical degrees apart). Their combined output signals are summed algebraically by subtracting the output signals from one set from the output signals of the other set. Thus, any axial movement of the input shaft results in negligible modification to their combined output signals.

According to a fourth embodiment of the present invention, two sets of proximity transducers are disposed in radial directions for measuring coordinate displacements of a substantially cylindrical surface that undulates sinusoidally in a radial direction. The substantially cylindrical surface has at least two sinusoidal undulations (i.e., such that each proximity detector measures at least 720 electrical degrees per revolution of the input shaft). The two sets of transducers are positioned such that they are in an electronically synchronized orientation (i.e., their output signals are an integral multiple of 360 electrical degrees apart). Their combined output signals are summed algebraically by adding the output signals of one set to the output signals of the other set. Thus, any radial movement of the input shaft results in negligible modification to their combined output signals. In addition, since axial movement of the substantially cylindrical surface contributes only negligibly to the outputs of any of the proximity detectors, their combined output signals are substantially immune to axial "common mode" displacements as well.

In a fifth structural embodiment, three sets of proximity transducers are disposed in radial directions for measuring coordinate displacement of a substantially cylindrical surface which undulates sinusoidally in a radial direction. The substantially cylindrical surface has at least three sinusoidal undulations (i.e., such that each proximity detector measures 1080 electrical degrees per revolution of the input shaft). The three sets of transducers are positioned such that they are in an electronically synchronized orientation (i.e., their output signals are an integral multiple of 360 electrical degrees apart). Their combined output signals are manipulated trigonometrically and summed algebraically. Thus, any radial movement of the input shaft results in negligible modification to their combined output signals.

Various other objects and advantages of the present invention will become more apparent to one skilled in the art from reading the following specification taken in conjunction with the appended claims and the following drawings.

DETAILED DESCRIPTION OF THE PREFERRED EMBODIMENTS

Figure 1:
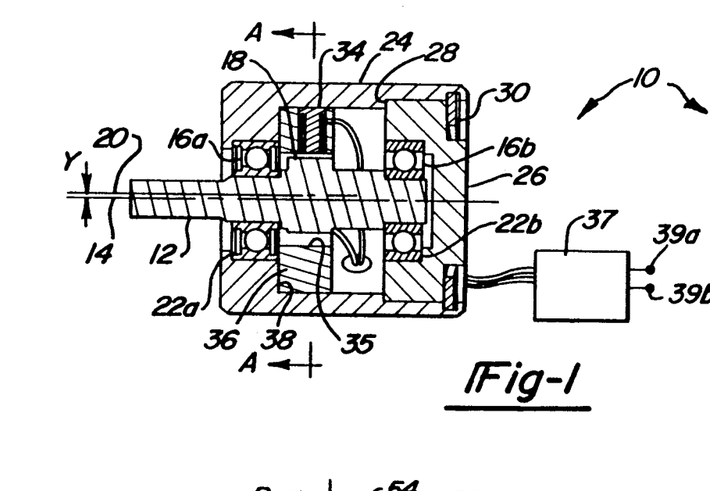
FIG. 1 is a longitudinal cross-sectional view of an improved tachometer according to a first structural embodiment of the present invention.
Figure 2:
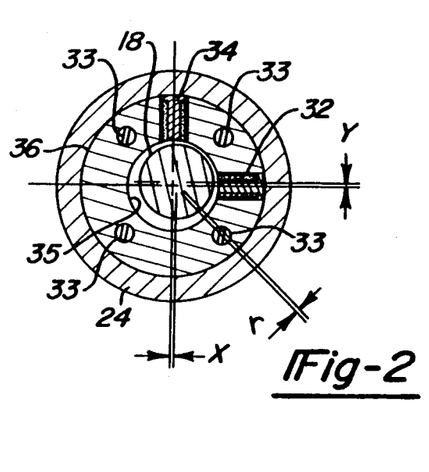
FIG. 2 is a cross-sectional view taken along line A—A of FIG. 1.

With reference to the drawings, FIGS. 1 and 2 are longitudinal and diametral section views, respectively, of a tachometer 10 according to one embodiment of the present invention. In particular, an input shaft 12 is driven rotationally about a center line 14 by a device (not shown) whose rotational speed is to be measured. The input shaft 12 is constrained to rotate about the center line 14 by bearings 16a and 16b. An eccentric 18 is formed upon the input shaft 12. The eccentric 18 is formed about an offset center line 20 which is parallel to and located a radial distance "r" from the center line 14 of the input shaft 12. The bearings 16a and 16b are positioned in cavities 22a and 22b, respectively, which are formed in a housing 24 and cover 26, respectively. The cover 26 is positioned concentrically within the housing 24 against a shoulder 28 and is retained thereagainst by a fastener, such as bowed retaining ring 30.

First and second proximity transducers 32 and 34 (such as those manufactured by Kaman Instrumentation Corporation of Colorado Springs, Col.), respectively, are located with a 90 degree included angle therebetween (i.e., in quadrature relationship one another) The proximity transducers 32 and 34 are positioned in a transverse plane to center line 14 at a substantially uniform radial distance therefrom within a detector mount 36. Detector mount 36 is retained in abutting engagement with shoulder 38 provided in the housing 24 as by screws 33. Detector mount 36 has a cylindrical aperture 35 within which eccentric 18 is positioned.

According to the present invention, the first and second proximity transducers 32 and 34 are operated in a substantially linear mode to measure offset dimensions x and y, respectively. In particular, the dimensions x and y are used to indicate the particular rotational location "$\Theta$" of the offset center line 20 with respect to the center line 14. Thus, the radial distance r is nominally equal to $(y^2+x^2)^{0.5}$.

The first and second proximity transducers 32 and 34 may be of any suitable type. For instance, inductive and capacitive proximity detectors are two particular transducer types that are suitable for application to the improved tachometer 10. As is known, detector systems utilizing such proximity transducers typically include a signal conditioning device or circuit which is schematically indicated as block 37 such that analog signals representative of the dimension x and y are located at terminals 39a and 39b.

Figure 3:
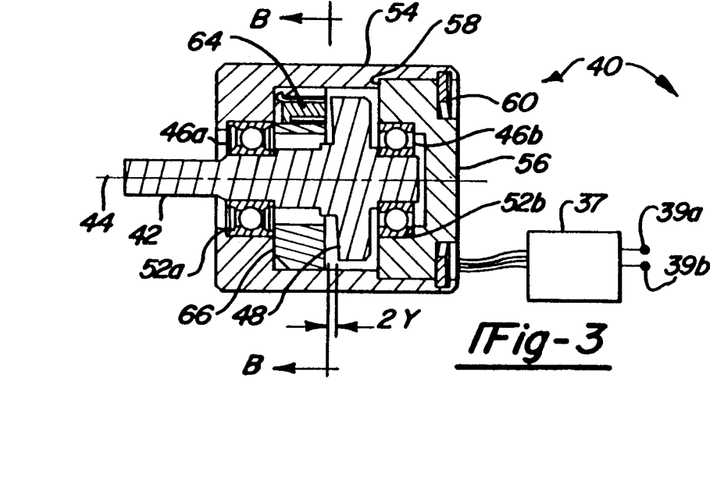
FIG. 3 is a longitudinal cross-sectional view of an improved tachometer according to a second structural embodiment of the present invention.
Figure 4:
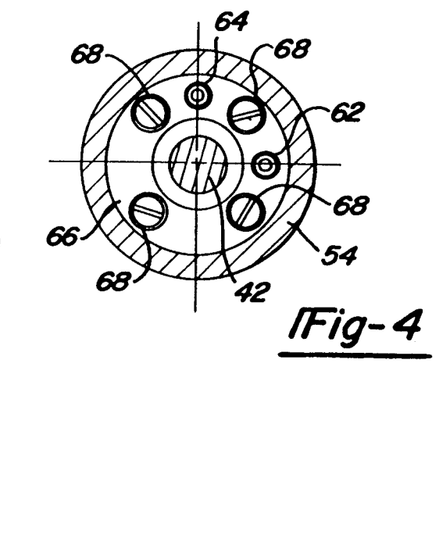
FIG. 4 is a cross-sectional view taken along line B—B of FIG. 3.

With reference now to FIGS. 3 and 4, an alternative structural embodiment of the present invention is disclosed. More specifically, FIGS. 3 and 4 are longitudinal and diametral section views, respectively, of a tachometer 40. An input shaft 42 is driven rotationally by a device (not shown) whose rotational speed is to be measured. The input shaft 42 is constrained to rotate about a center line 44 with minimal axial cam action by bearings 46a and 46b. A sinusoidally undulating, transversely extending surface 48 is formed upon the input shaft 42. The sinusoidal surface 48 is formed with an axial peak-to-peak undulation amplitude of 2r. Again, "r" is nominally equal to $(y^2+x^2)^{0.5}$. The bearings 46a and 46b are positioned in cavities 52a and 52b, respectively, which are formed in a housing 54 and a cover 56, respectively. The cover 56 is positioned concentrically within the housing 54 against a shoulder 58 and is retained thereagainst by a fastener, such as a bowed retaining ring 60.

First and second proximity transducers 62 and 64, respectively, are located with a 90 degree included angle therebetween (i.e., in quadrature relationship one to another). The proximity transducers 62 and 64 are positioned in a plane that is substantially orthogonal to the center line 44 within a detector mount 66 which is retained in the housing 54 by screws 68. Furthermore, the proximity transducers 62 and 64 are aligned axially in generally facing relation with respect to surface 48. As previously described, the first and second proximity transducers 62 and 64 are operated in a substantially linear mode to measure offset dimensions x and y, respectively. The dimensions x and y indicate a particular rotational location "Θ" of the sinusoidal surface 48.

Figure 5:
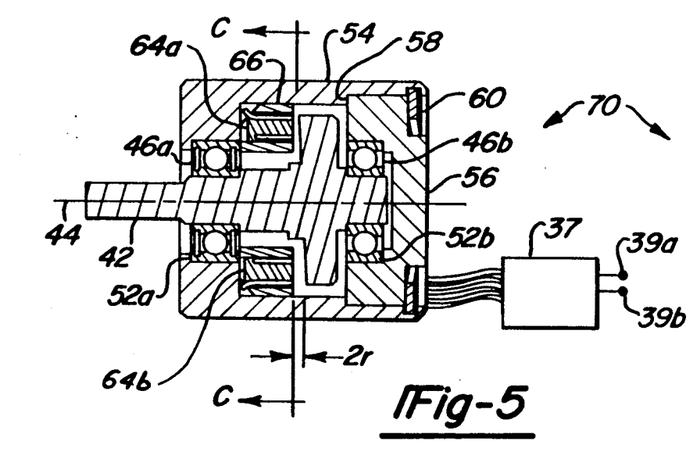
FIG. 5 is a longitudinal cross-sectional view of an improved tachometer according to a third structural embodiment of the present invention.
Figure 6:
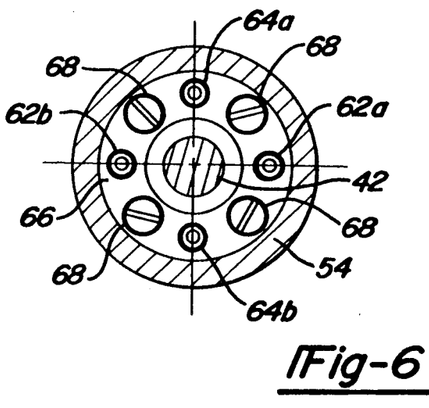
FIG. 6 is a cross-sectional view taken along line C—C of FIG. 5.

According to a third structural embodiment, operation of a tachometer 70 can be enhanced by utilizing first and second pairs of diametrically opposed proximity transducers 62a and 62b, and 64a and 64b, respectively, as is shown in FIGS. 5 and 6. More particularly, nominally redundant proximity transducers 62b and 64b are mounted in diametrically opposed orientation relative to the proximity transducers 62a and 64a, respectively. In one preferred method of operation, output signals of the nominally redundant proximity transducers 62b and 64b are subtracted from output signals of the corresponding proximity transducers 62a and 64a, respectively, to yield signals of doubled magnitude which are more nearly linear. In addition, any common mode input to the proximity transducers due to axial play in the interface between the input shaft 42 and the bearings 46a and 46b is negated because of the algebraic summing of the output signals of the proximity transducers 62b and 64b with the corresponding output signals of the proximity transducers 62a and 64a, respectively, as described above. Relatively failsafe operation is obtained by comparing the individual signal from each of the four proximity detectors with half of its corresponding doubled signal. If the individual signal deviates excessively, a diagnostic output signal will indicate that tachometer 70 is defective.

Each of the proximity transducer arrangements herebefore described generate signals which are representative of offset dimensions x and y. For positive values of x, the rotational position Θ is indicated by:

$$\Theta = \tan^{-1}(y/x) \quad (1)$$

The desired rotational velocity dΘ/dt can be found by:

$$d\Theta/dt = [1/(1+(y/x)^2)] \, d(y/x)/dt \quad (2)$$

This expression can be algebraically simplified to yield:

$$d\Theta/dt = (x \, dy/dt - y \, dx/dt)/(x^2 + y^2) \quad (3)$$

Since $(x^2 + y^2)$ is nominally equal to $r^2$, this expression can be further simplified to a final form where:

$$d\Theta/dt = (x \, dy/dt - y \, dx/dt)/r^2 \quad (4)$$

Figure 7:
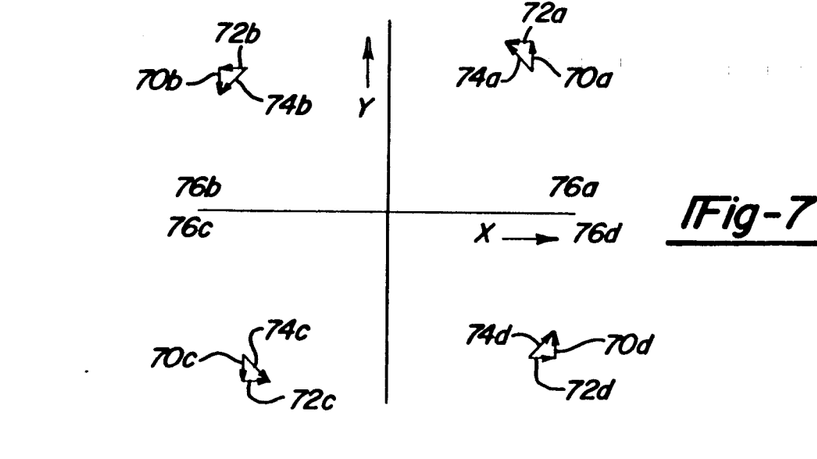
FIG. 7 is a diagrammatical illustration which depicts differential vectors dy/dt and dx/dt yielding positive values for $d\Theta/dt$ in each of the first, second, third and fourth quadrants of the exemplary x-y plot.

The expression $\Theta = \tan^{-1}(y/x)$ is valid for positive values of x only. However, the expression $d\Theta/dt = (x \, dy/dt - y \, dx/dt)/r^2$ includes the product terms $x \, dy/dt$ and $y \, dx/dt$ each of which are sign correct for all four quadrants (i.e., in the first quadrant x is positive and y is positive; in the second quadrant x is negative and y is positive; in the third quadrant x is negative and y is negative; and in the fourth quadrant x is positive and y is negative). This is illustrated in FIG. 7 which is a diagrammatic x-y plot depicting dy/dt vectors 70a, 70b, 70c and 70d, and dx/dt vectors 72a, 72b, 72c and 72d, which correspondingly yield positively valued dΘ/dt resultant vectors 74a, 74b, 74c and 74d, respectively. As illustrated, the resultant vectors 74a, 74b, 74c and 74d are located in the first, second, third and fourth quadrants 76a, 76b, 76c and 76d, respectively, of the x-y plot of FIG. 7. In each case, the algebraic sum of the products x dy/dt and (−) y dx/dt results in a positive value of dΘ/dt. For example, in the third quadrant 76c, both of the offset dimensions x and y have negative values while the dy/dt and dx/dt vectors 70c and 72c, respectively, have negative and positive values, respectively. Thus, the product x dy/dt has a sign value of (−)(−)=(+) while the product y dx/dt, likewise has a sign value of (−)(−)(+)=(+).

Figure 8:
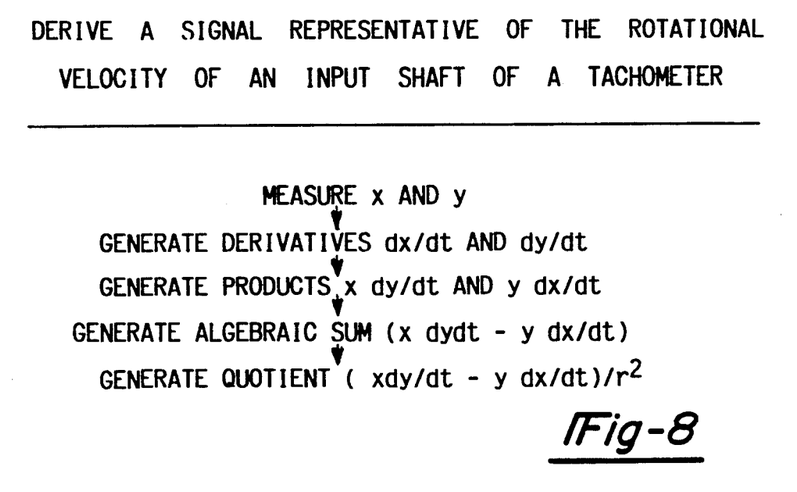
FIG. 8 is a flow chart outlining a method of deriving a signal representative of the rotational velocity $d\Theta/dt$ of an input shaft associated with each of the improved tachometers of the present invention.

With reference now to FIG. 8, a flow chart is presented that outlines an exemplary procedure for deriving a signal that is representative of the rotational velocity dΘ/dt for the input shaft associated with each tachometer 10, 40, and 70, each of which being constructed according to the various embodiments of the present invention herebefore described. This procedure is initialized by measuring displacements x and y via linear voltage signals from the first and second proximity transducers 32 and 34 of tachometer 10, the first and second proximity transducers 62 and 64 of tachometer 40, or the diametrically opposing pairs of first and second proximity transducers 62a and 62b, and 64a 64b of tachometer 70. Next, the displacements x and y are differentiated with respect to time such that the derivatives dx/dt and dy/dt are generated. Thereafter, the products x dy/dt and y dx/dt are generated, from which the algebraic sum (x dy/dt − y dx/dt) is calculated. Finally, the quotient (x dy/dt − y dx/dt)/r² is generated to yield the desired tachometer output dΘ/dt.

If the above computation procedure is performed digitally via a microprocessor chip (not shown), which has been programmed according to the teachings described above, the tachometer output signal dΘ/dt generated is valid for one particular instant in time. To generate a continuous tachometer output from such a microprocessor chip, the above described procedure is repeated at a refresh rate significantly higher than the operating band width of a parent control system (not shown). Since such refresh rates can exceed 1,000 Hz in servomechanism applications, the very simple calculation described above is a significant factor in enabling such continuous tachometer operation.

Figure 9:
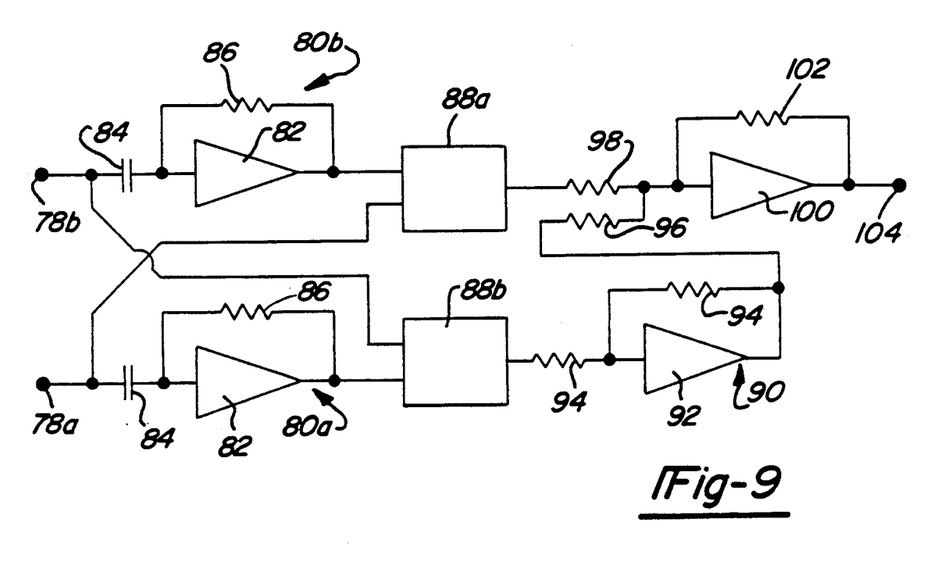
FIG. 9 is an equivalent analog circuit utilized in performing the computations embodied in the flow chart of FIG. 8.

Alternately, continuous analog computation is possible as is illustrated in FIG. 9. In particular, FIG. 9 is a schematic diagram of a circuit adapted for performing the previously described computations in an analog manner. As such, the x and y measurement signals are applied to input terminals 78a and 78b, respectively. Signals representing the differentials of the x and y measurement signals with respect to time, dx/dt and dy/dt, are generated by differentiating circuits 80a and 80b, respectively, which each include an operational amplifier 82, capacitor 84 and resistor 86 configured in a known manner. Signals representing the products x dy/dt and y dx/dt are generated by multiplying chips 88a and 88b, respectively. (Suitable multiplying chips for this purpose can be obtained from Analog Devices of Wilmington, Mass.). The algebraic sign of the signal representing the product y dx/dt is inverted by an invertor circuit 90 which comprises operational amplifier 92 and two substantially equal valued resistors 94 configured in a known manner. The resulting inverted signal is summed with the signal representing the product x dy/dt via summing resistors 96 and 98, respectively, to generate a signal representing the algebraic sum (x dy/dt − y dx/dt). This signal is multiplied in a known manner by operational amplifier 100 and feedback resistor 102 to generate a signal representative of the desired quotient $(x\,dy/dt - y\,dx/dt)/r^2$ at output terminal 104.

Figure 10:
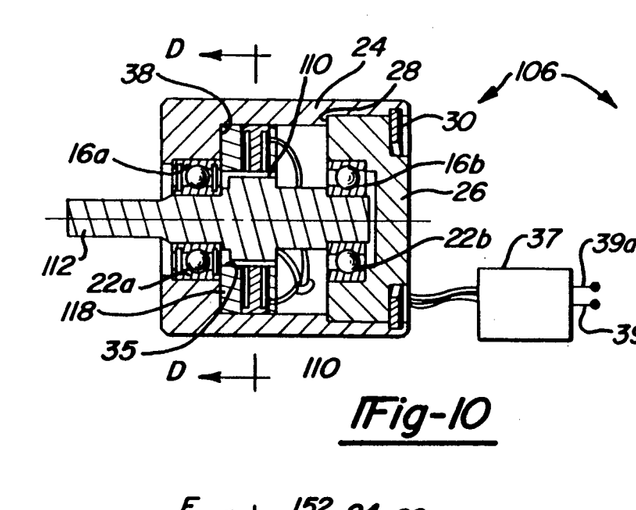
FIG. 10 is a longitudinal cross-sectional view of an improved tachometer according to a fourth structural embodiment of the present invention.
Figure 11:
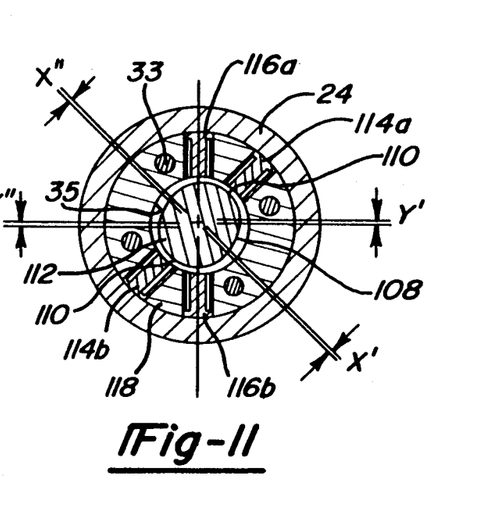
FIG. 11 is a cross-sectional view taken along line D—D of FIG. 10.

With reference to FIGS. 10 and 11, the operation of a fourth structural embodiment of an improved tachometer 106 can be enhanced by utilizing multiple pairs of radially disposed proximity transducers for measuring multiple sets of offset positions x and y. The multiple offset positions correspond to a generally elliptical surface 108 having more than one sinusoidal undulation or "lobe" 110 which is formed upon an input shaft 112. In general, the number of the multiple pairs of proximity transducers and corresponding sinusoidal undulations, as well as the relative orientation therebetween, is chosen such that any untoward radial offsetting motion of input shaft 112 of tachometer 106 does not effect the output signals derived from the multiple pairs of proximity transducers. While it is possible to envision a plethora of numerical combinations of multiple pairs of proximity transducers and sinusoidal undulations, the novel principles embodied in the present invention are adequately illustrated in FIGS. 10 through 14. The first pair of proximity transducers 114a and 116a, and second pair of proximity transducers 114b and 116b, secured within detector mount 118, are utilized to measure first and second sets of offset positions x' and y', and x" and y", respectively, associated with the two sinusoidal undulations 110 formed upon input shaft 112.

Since undulating surface 108 includes two complete sinusoidal undulation profiles or "lobes" 110, the output signals from first and second pairs of proximity transducers 114a and 116a, and 114b and 116b, respectively, which represent measured values of the first and second sets of offset positions x' and y', and x" and y", respectively, each comprise 720 degrees of sinusoidal phase variation per revolution of input shaft 112.

Nominally redundant proximity transducers 114b and 116b are mounted in diametrically opposed orientation relative to proximity transducers 114a and 114b, respectively. Thus, the signals from proximity transducers 114a and 114b are representative of x' and x", and the signals from proximity transducers 116a and 116b are representative of y' and y" which are oriented 360 degrees one from another and, therefore, are in phase one with another. Further, proximity transducer 114a is located 45 degrees from proximity transducer 116a, and proximity transducer 114b is located 45 degrees from proximity transducer 116b. Thus, each pair of signals representative of x' and y', and x" and y" is in quadrature in the manner described above.

Output signals representing nominal "offset dimensions" x and y are obtained by summing the signals representative of x' and x", and y' and y", respectively. Undesirable "common mode" inputs associated with untoward radial motion of input shaft 112 are cancelled since any resulting change in either x' or y' is offset by a substantially opposite change in x" or y", respectively, whereby their respective sums x and y are substantially unchanged. Similarly, because undulating surface 108 is substantially elliptically cylindrical, the signals representative of x', x", y' and y" are substantially unaffected by any untoward axial motion of input shaft 112. Also, it can be seen that the signals representative of x', x", y' and y" are substantially unaffected by any untoward pitch and yaw motions of input shaft 112. Thus, the only mode of motion of input shaft effects the signals representative of x', x", y', and 112 which effects the signals representative of x', x", y', and y" is a roll motion which is the mode the proximity detectors are intended to measure.

Figure 12:
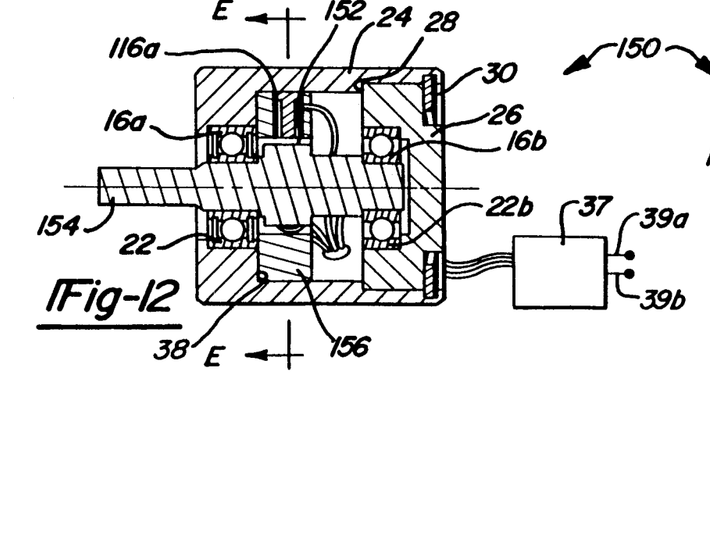
FIG. 12 is a longitudinal cross-sectional view of an improved tachometer according to a fifth structural embodiment of the present invention.
Figure 13:
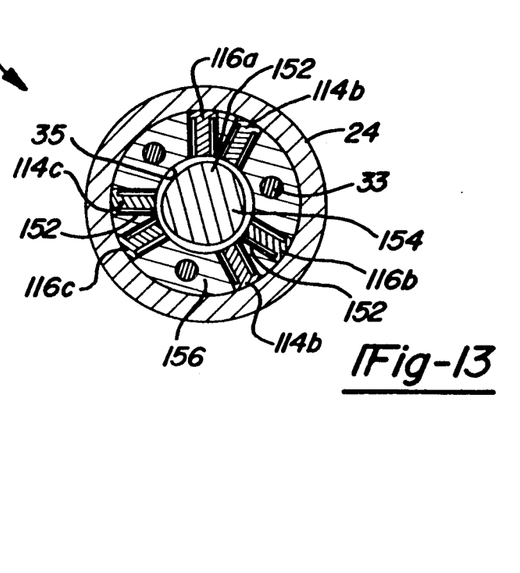
FIG. 13 is a cross-sectional view taken along line E—E of FIG. 12.

An alternative structural embodiment of an improved tachometer 150 is shown to have an "odd" number of sinusoidal undulations or lobes 152 can be utilized with an odd number of pairs of proximity detectors 114 and 116. For instance, it is possible to utilize an undulating surface comprising 1080 degrees of sinusoidal phase variation per revolution of an input shaft 154 (i.e., an input shaft having three lobes 152) together with three pairs of proximity detectors 114 and 116 secured within detector mount 156 and oriented at nominal 120 degree locations around input shaft 154. The resultant sums of signals representative of x and y will be substantially unaffected by an untoward radial motions of input shaft 154 because the appropriate trigonometric (i.e., sine or cosine) multiplication is concomitant with the vector representation thereof.

Figure 14:
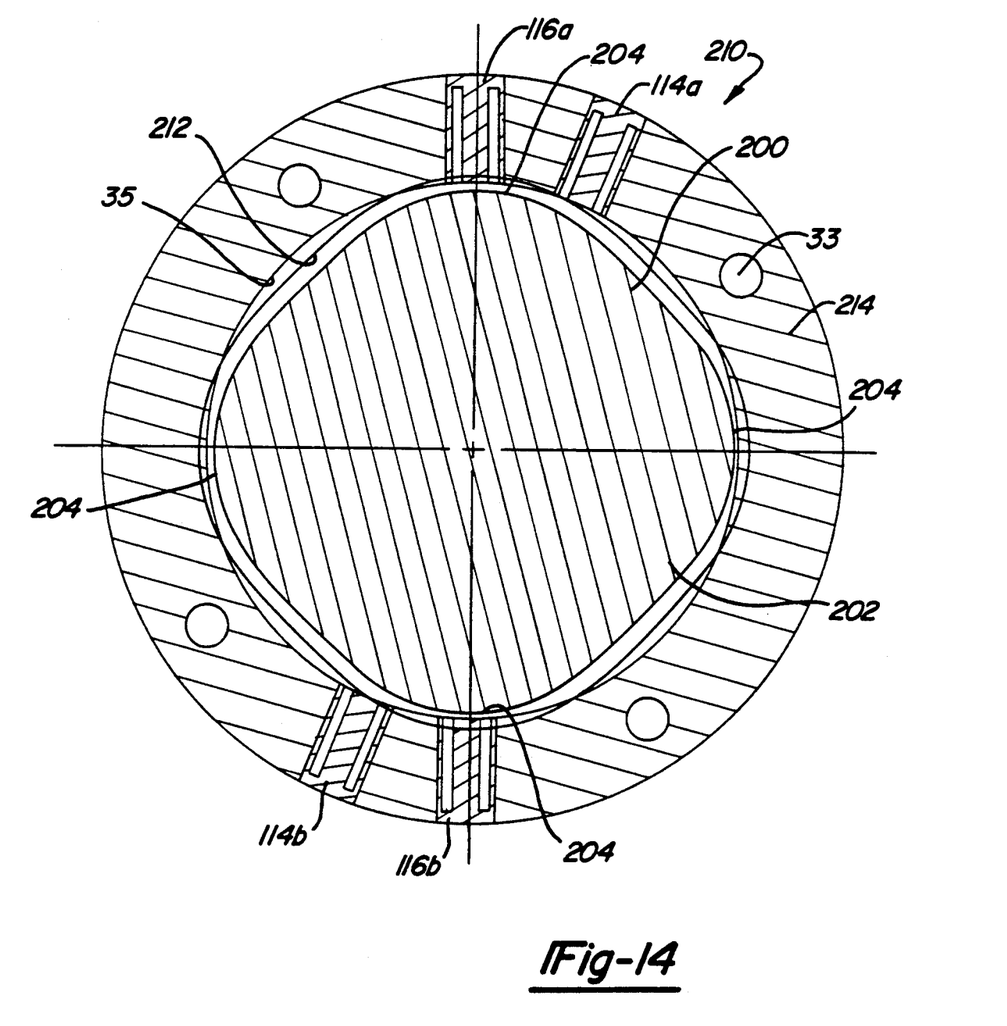
FIG. 14 is an enlarged view similar to FIG. 11 illustrating an alternative input shaft which is adapted for use with the improved tachometer.

An undulating surface 200 having an "even" number of sinusoidal undulations greater than two can be utilized with the pairs of proximity detectors 114a and 116a, and 114b and 116b, as is shown in FIG. 14. Undulating surface 200 has 1440 degrees of sinusoidal phase variation per revolution of input shaft 202 since surface 200 forms four (4) equidistant lobes 204. The advantage in utilizing an increased number of lobes 204 on input shaft 202 is that the values of dx/dt and dy/dt increase proportionally with the number of lobes utilized. Because the output signal of the improved tachometer 210 of the present invention having undulating surface 200 is linearly dependent upon the values of dx/dt and dy/dt (as is thoroughly described above), there is a concomitant increase in the output signal of the tachometer 210.

If slope values $dr/d\Theta$ of undulating surface 200 are relatively large, it may be desirable to deviate from strict sinusoidal undulation due to "fringing" effects of proximity detectors 114a, 114b, 116a and 116b. For instance, undulating surface 200 is depicted as an undulating surface that is a fixed distance from a reference line 212 that undulates sinusoidally about a cylindrical aperture 35 in detector mount 214 which defines a circle including the radial inward ends of proximity detectors 114a, 116a, 114b and 116b.

Figure 15:
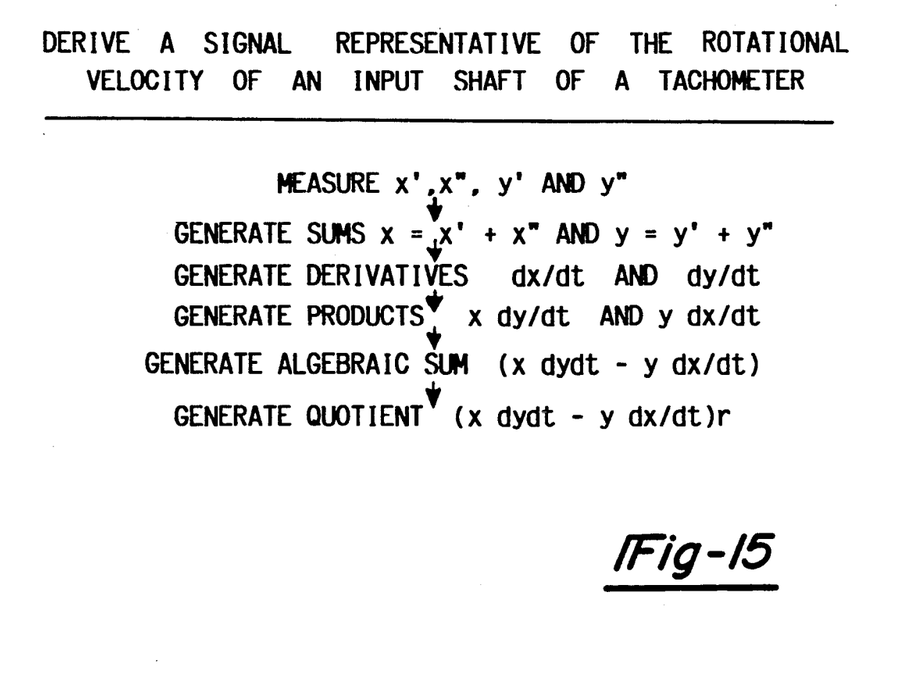
FIG. 15 is a flow chart outlining a method of deriving a signal representative of the rotational velocity $d\Theta/dt$ of the input shaft associated with the improved tachometers of FIGS. 10 and 12.

With reference now to FIG. 15, a flow chart is presented that outlines an exemplary procedure for deriving a signal that is representative of the rotational velocity of $d\Theta/dt$ for any of the input shafts 112, 154 or 202. This procedure is similar to that described above with reference to FIG. 9. However, it additionally includes a first step wherein all displacements relating to determination of displacements x and y (i.e., x' and x", and y' and y") are measured. The displacements x and y are then determined by generating sums $x = x' + x"$ and $y = y' + y"$, respectively. Thereinafter, the procedure depicted in FIG. 13 follows that already described above with reference to FIG. 9.

If the above additional computation procedure is performed digitally via a microprocessor chip (not shown), it can be further programmed according to the additional teachings of FIG. 15 and internally generate digital signals representative of x and y. On the other hand, if continuous analog computation is utilized as described above with reference to FIG. 9, or even if it is desired to generate analog signals representative of x and y for application (via an A to D apparatus—not shown) to digital computation, continuous analog computation thereof is possible as is illustrated in FIG. 16.

Figure 16:
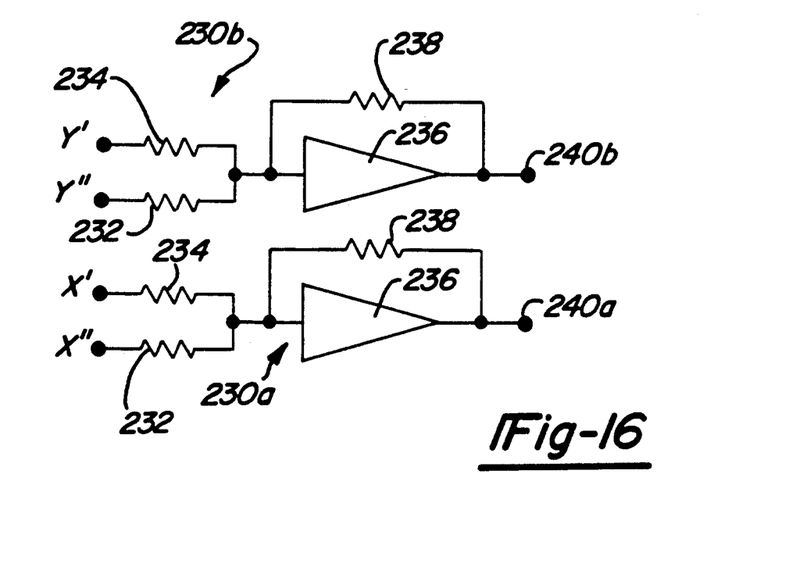
FIG. 16 is an addition to the analog circuit of FIG. 9 utilized in performing the computations embodied in the flow chart of FIG. 15.

In particular, FIG. 16 is a schematic diagram depicting two identical summing circuits 230a and 230b for generating the sums $x=x'+x''$ and $y=y'+y''$, respectively. In each one of summing circuits 230a and 230b, input signals representative of $x'$ and $x''$, or $y'$ and $y''$ are summed via substantially identical summing resistors 232 and 234, respectively, and multiplied in a known manner using an operational amplifier 236 and feedback resistor 238. Intermediate signals representative of x and y are present at intermediate output terminals 240a and 240b, respectively, which are interconnected to input terminals 78a and 78b, respectively, of the analog circuit of FIG. 9.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A tachometer for measuring the angular velocity of a rotating device comprising:
    an input shaft coupled to the rotating device for rotation therewith about a first center line, said input shaft having eccentric surface means forming two substantially sinusoidal undulations which are offset from said first center line; and
    a first pair of proximity detectors oriented with respect to said two sinusoidal undulations for generating output signals defining a first set of $x'$ and $y'$ coordinate signals, a second pair of proximity detectors oriented with respect to said two sinusoidal undulations for generating output signals defining a second set of $x''$ and $y''$ coordinate signals, said first and second sets of coordinate signals being algebraically summed to derive x and y offset dimensions where $x=x'+x''$ and $y=y'+y''$ for substantially negating any radial and axial displacement errors associated with rotation of said input shaft, said x and y offset dimensions being indicative of the rotational location of said eccentric surface means with respect to said first and second pairs of proximity detectors.

2. The tachometer of claim 1 wherein said first and second pairs of proximity detectors are oriented in a radial direction relative to said input shaft for measuring said first and second sets of x and y coordinate displacements respectively associated with said first and second sinusoidal undulations such that each proximity detector measures at least 720 electrical degrees per revolution of said input shaft.

3. The tachometer of claim 2 wherein said two sinusoidal undulations extend radially to form a generally elliptical section on said input shaft such that said sinusoidal undulations are diametrically opposed with respect to said first center line.

4. The tachometer of claim 3 wherein said generally elliptical section of said cylindrical input shaft defines second and third center lines which are parallel to and equally and oppositely offset from said first center line by an offset distance r where r is substantially equal to about $(x^2+y^2)^{0.5}$.

5. The tachometer of claim 4 wherein said first and second pairs of proximity detectors are positioned at a predefined outwardly radial distance from said first center line, said first and second pairs of proximity detectors operable in a substantially linear mode upon rotation of said input shaft, and wherein said first and second sets of x and y offset dimensions represent the location of said second and third center lines respectively with respect to said first center line.

6. The tachometer of claim 1 further comprising a third set of proximity detectors and wherein said eccentric surface means includes three substantially sinusoidal undulations, said first, second and third pairs of proximity detectors being oriented in a radial direction relative to said input shaft for generating output signals defining three sets of coordinate signals which are trigonometrically manipulated and algebraically summed such that each proximity detector measures at least about 1080 electrical degrees per revolution of said input shaft.

7. The tachometer of claim 1 wherein said summed x and y signals are interfaced with signal manipulation means for generating a signal that is indicative of the rotational velocity of said input shaft.

8. The tachometer of claim 7 wherein said signal manipulating means differentiates said summed x and y signals with respect to time to generate differential signals dx/dt and dy/dt, said signal manipulation means generating product signals representative of the products x dy/dt and y dx/dt, and wherein said signal manipulation means thereafter generates a summation signal indicative of an algebraic sum x dy/dt − y dx/dt such that a quotient signal representative of the rotational velocity of said input shaft is generated from the quotient $(x\,dy/dt - y\,dx/dt)/r^2$.

9. The tachometer of claim 8 wherein said signal manipulation means is a programmable microprocessor adapted to generate a digital quotient signal, said manipulation means further including means for continuously calculating said digital quotient signal.

10. The tachometer in accordance with claim 8 wherein said differential signals dx/dt and dy/dt, products signals x dy/dt and y dx/dt, algebraic sum signal x dy/dt − y dx/dt and quotient signal $(x\,dy/dt - y\,dx/dt)/r^2$ are generated in an analog manner by:
    said differentials signals dx/dt and dy/dt being generated by differentiating said summed x and y signals with respect to time via first and second differentiating circuits;
    said product signals x dy/dt and y dx/dt being generated by multiplying said summed x signal and said differential signal dy/dt together with a first multiplying chip, and multiplying said summed y signal and said differential signal dx/dt together with a second multiplying chip, respectively;
    said summation signal x dy/dt − y dxdt being generated by inverting said signal representative of said product y dx/dt with an inverting amplifier, and summing said inverted signal representative of said product −y dx/dt with said product signal x dy/dt with first and second summing resistors; and
    said quotient signal $(x\,dy/dt - y\,dx/dt)/r^2$ being generated by multiplying said summation signal x dy/dt − y dx/dt by a factor substantially equal to $1/r^2$ with an operational amplifier whose output is fed back with a feedback resistor.

11. A method of deriving a signal that is representative of the rotational velocity of a shaft comprising the steps of:
    forming at least two substantially sinusoidal undulations upon rotation of said shaft;
    measuring first and second sets of x and y signals that are representative of a rotational position of said first and second substantially sinusoidal undulations, respectively;

summing said first and second sets of x and y signals to define a resultant x and y signal;

generating signals representative of differentials dx/dt and dy/dt from said resultant x and y signals, respectively;

generating signals representative of the products x dy/dt and y dx/dt from the resultant x signal and said differential signal dy/dt, and the resultant y signal and the differential signal dx/dt, respectively; and generating a summation signal representative of an algebraic sum x dy/dt−y dx/dt from the product signals x dy/dt and y dx/dt.

12. The method of claim 11 comprising the additional step of generating a quotient signal from the algebraic sum x dy/dt−y dx/dt divided by a signal substantially representative of the quantity $r^2=(x^2+y^2)$, said quotient signal being indicative of the rotational velocity of said shaft.

13. A method of deriving a signal that is representative of the rotational velocity of a shaft comprising the steps of:

forming at least two substantially sinusoidal undulations upon rotation of said shaft;

measuring first and second sets of x and y signals that are representative of a rotational position of said first and second substantially sinusoidal undulations, respectively;

summing said first and second sets of x and y signals to define a resultant x and y signal;

generating digital signals representative of differentials dx/dt and dy/dt from said resultant x and y signals, respectively;

generating digital signals representative of the products x dy/dt and y dx/dt from the resultant x signal and said differential signal dy/dt, and the resultant y signal and the differential signal dx/dt, respectively; and generating a digital summation signal representative of an algebraic sum x dy/dt−y dx/dt from the product signals x dy/dt and y dx/dt.

14. The method of claim 13 comprising the additional step of generating a digital quotient signal from the algebraic sum x dy/dt−y dx/dt divided by a signal substantially representative of the quantity $r^2=(x^2+y^2)$, said quotient signal being indicative of the rotational velocity of said shaft.

15. The method of claim 14 comprising the additional step of repeating said method at a rate sufficient to provide a continuous quotient signal.

16. An apparatus for measuring the angular velocity dΘ/dt of a rotating device comprising:

an input shaft coupled to the rotating device for rotation therewith about a first center line, said input shaft having an eccentric surface with a first plurality of equally spaced sinusoidal undulations formed thereon;

a second plurality of pairs of radially disposed proximity transducers oriented with respect to said first plurality of sinusoidal undulations for generating a like number of sets of x and y coordinate signals, said sets of x and y coordinate signals being indicative of the rotational location Θ of said first plurality of sinusoidal undulations with respect to said second plurality of proximity detectors;

summing means for summing said sets of x and y coordinate signals to define resultant x and y signals; and signal manipulation means for generating a signal that is indicative of the rotational velocity dΘ/dt of said input shaft in response to said resultant x and y signals.

17. The apparatus of claim 16 wherein said signal manipulating means differentiates said resultant x and y signals with respect to time to generate differential signals dx/dt and dy/dt, said signal manipulation means generating product signals representative of the products x dy/dt and y dx/dt, and wherein said signal manipulation means thereafter generates a summation signal indicative of an algebraic sum x dy/dt−y dx/dt such that a quotient signal representative of the rotational velocity dΘ/dt of said input shaft is generated from said algebraic sum x dy/dt−y dx/dt divided by a signal representative of the quantity $r^2=x^2+y^2$.

18. The apparatus of claim 17 wherein said signal manipulation means is a programmable microprocessor adapted to generate a digital quotient signal, said signal manipulation means including means for continuously calculating said digital quotient signal.

19. The apparatus of claim 17, wherein said differential signals dx/dt and dy/dt, products signals x dy/dt and y dx/dt, algebraic sum signal x dy/dt−y dx/dt and quotient signal (x dy/dt−y dx/dt)/$r^2$ are generated in an analog manner by:

said differentials signals dx/dt and dy/dt being generated by differentiating said resultant x and y signals with respect to time via first and second differentiating circuits;

said product signals x dy/dt and y dx/dt being generated by multiplying said resultant x signal and said differential signal dy/dt together with a first multiplying circuit, and multiplying said resultant y signal and said differential signal dx/dt together with a second multiplying circuit, respectively;

said summation signal x dy/dt−y dx/dt being generated by inverting said signal representative of said product y dx/dt with an inverting amplifier, and summing said inverted signal representative of said product −y dx/dt with said product signal x dy/dt with first and second summing resistors; and said quotient signal (x dy/dt−y dx/dt)/$r^2$ being generated by multiplying said summation signal x dy/dt−y dx/dt by a factor substantially equal to 1/$r^2$ with an operational amplifier whose output is fed back with a feedback resistor.

20. The apparatus of claim 17 wherein said first plurality of sinusoidal undulations is equivalent in number to said second plurality of pairs of proximity transducers.

* * * * *